United States Patent
Ehrenberg (10) Patent No.: US 8,898,410 B1
(45) Date of Patent: Nov. 25, 2014

(54) EFFICIENT GARBAGE COLLECTION IN A DATA STORAGE DEVICE

(71) Applicant: Daniel Ari Ehrenberg, San Francisco, CA (US)

(72) Inventor: Daniel Ari Ehrenberg, San Francisco, CA (US)

(73) Assignee: Google Inc., Mountain View, CA (US)

( * ) Notice: Subject to any disclaimer, the term of this patent is extended or adjusted under 35 U.S.C. 154(b) by 157 days.

(21) Appl. No.: 13/771,913

(22) Filed: Feb. 20, 2013

(51) Int. Cl.
 G06F 12/00 (2006.01)
 G06F 12/02 (2006.01)

(52) U.S. Cl.
 CPC .................................. *G06F 12/0253* (2013.01)
 USPC ..................... 711/162; 711/E12.009

(58) Field of Classification Search
 None
 See application file for complete search history.

(56) References Cited

U.S. PATENT DOCUMENTS

| | | | |
|---|---|---|---|
| 6,430,580 B1 * | 8/2002 | Azagury et al. ...................... | 1/1 |
| 7,769,792 B1 | 8/2010 | Burrows et al. | |
| 7,865,536 B1 | 1/2011 | Ghemawat et al. | |
| 8,065,268 B1 * | 11/2011 | Ghemawat et al. ........... | 707/610 |
| 8,321,652 B2 * | 11/2012 | Hinz .............................. | 711/206 |
| 8,346,820 B2 | 1/2013 | Kesselman et al. | |
| 8,489,817 B2 * | 7/2013 | Flynn et al. .................... | 711/128 |
| 2003/0055910 A1 * | 3/2003 | Amini et al. ................... | 709/214 |
| 2007/0174579 A1 * | 7/2007 | Shin .............................. | 711/170 |
| 2009/0319720 A1 * | 12/2009 | Stefanus et al. ............... | 711/103 |
| 2010/0023672 A1 * | 1/2010 | Gorobets et al. .............. | 711/103 |
| 2010/0030999 A1 * | 2/2010 | Hinz .............................. | 711/206 |
| 2010/0100667 A1 * | 4/2010 | Kang et al. ..................... | 711/103 |
| 2010/0262766 A1 | 10/2010 | Sprinkle et al. | |
| 2010/0287217 A1 | 11/2010 | Borchers et al. | |
| 2011/0055458 A1 * | 3/2011 | Kuehne .......................... | 711/103 |
| 2011/0125704 A1 * | 5/2011 | Mordvinova et al. ......... | 707/600 |
| 2011/0138105 A1 * | 6/2011 | Franceschini et al. ........ | 711/103 |
| 2011/0196838 A1 * | 8/2011 | Zunger et al. .................. | 707/636 |
| 2011/0196901 A1 * | 8/2011 | Kesselman et al. ........... | 707/813 |
| 2011/0258391 A1 * | 10/2011 | Atkisson et al. .............. | 711/118 |
| 2011/0296132 A1 * | 12/2011 | Li et al. .......................... | 711/166 |
| 2012/0124294 A1 * | 5/2012 | Atkisson et al. .............. | 711/135 |
| 2012/0210041 A1 * | 8/2012 | Flynn et al. ....................... | 711/3 |

OTHER PUBLICATIONS

David Geer, "Reducing the Storage Burden Via Data Deduplication", Industry Trends, IEEE Computer Society, Dec. 2008, pp. 15-17.*
Webopedia, "Garbage Collection", Dec. 20, 2009, pp. 1-3, http://web.archive.org/web/20091220052543/http://www.webopedia.com/TERM/G/garbage_collection.html.*

* cited by examiner

*Primary Examiner* — Edward Dudek, Jr.
*Assistant Examiner* — Christopher Birkhimer
(74) *Attorney, Agent, or Firm* — Brake Hughes Bellermann LLP (57) ABSTRACT

A method includes determining which of a plurality of blocks of data in a data storage device having a plurality of memory devices to copy during garbage collection using a cost function based on a number of free pages and a number of replicated pages in each of the blocks, where the replicated pages include replicated data that is a copy of data stored in another storage device and determining not to copy one or more of the blocks of data during garbage collection based on the cost function.

20 Claims, 5 Drawing Sheets

EFFICIENT GARBAGE COLLECTION IN A DATA STORAGE DEVICE

TECHNICAL FIELD

This description relates to efficient garbage collection in a data storage device.

BACKGROUND

Data storage devices may be used to store data. A data storage device may be used with a computing device to provide for the data storage needs of the computing device. In certain instances, it may be desirable to store large amounts of data on a data storage device. Also, it may be desirable to execute commands quickly to read data and to write data to the data storage device.

SUMMARY

This document describes devices, systems and techniques using the devices and systems to manage data during garbage collection including marking data as replicated data during writes from an application on a host device to a data storage device. During garbage collection, the component managing the garbage collection process determines which blocks of data to copy using a cost function that takes into account a number of free pages and a number of replicated pages in each block in order to reduce write amplification. The application on the host device is notified of replicated data that is not copied during garbage collection.

In one general aspect, a method includes, responsive to a write command from an application on a host device, writing data to a data storage device having a plurality of memory devices, where the data includes an indicator that indicates whether or not the data is replicated data, the replicated data being a copy of data stored in another storage device, determining not to copy the data during garbage collection when the indicator indicates that the data is replicated data and providing a notification to the application that the replicated data was erased and not copied.

In another general aspect, a method includes determining which of a plurality of blocks of data in a data storage device having a plurality of memory devices to copy during garbage collection using a cost function based on a number of free pages and a number of replicated pages in each of the blocks, where the replicated pages include replicated data that is a copy of data stored in another storage device and determining not to copy one or more of the blocks of data during garbage collection based on the cost function.

In another general aspect, a data storage device includes multiple memory devices with each of the memory devices being arranged into multiple blocks having multiple pages for storing data. The data storage device includes a memory controller operationally coupled with the flash memory devices. The memory controller is configured to write data to one of the memory devices responsive to a write command from an application on a host device, where the data includes an indicator that indicates whether or not the data is replicated data, where the replicated data is a copy of data stored in another storage device. The memory controller is configured to determine not to copy the data during garbage collection when the indicator indicates that the data is replicated data and provide a notification to the application that the replicated data was erased and not copied.

In another general aspect, a system includes a host device having one or more applications and a data storage device operationally coupled with the host device. The data storage device includes multiple memory devices with each of the memory devices being arranged into multiple blocks having multiple pages for storing data. The data storage device includes a memory controller operationally coupled with the flash memory devices. The memory controller is configured to write data to one of the memory devices responsive to a write command from the application on the host device, where the data includes an indicator that indicates whether or not the data is replicated data, where the replicated data is a copy of data stored in another storage device. The memory controller is configured to determine not to copy the data during garbage collection when the indicator indicates that the data is replicated data and provide a notification to the application that the replicated data was erased and not copied.

In another general aspect, a method and/or device includes means for determining which of multiple blocks of data in a storage device having multiple memory devices to copy during garbage collection using a cost function based on a number of free pages and a number of replicated pages in each of the blocks, where the replicated pages include replicated data that is a copy of data stored in another storage device and means for determining not to copy one or more of the blocks of data during garbage collection based on the cost function.

The details of one or more implementations are set forth in the accompanying drawings and the description below. Other features will be apparent from the description and drawings, and from the claims.

DETAILED DESCRIPTION

This document describes systems and techniques to manage data on a data storage device in conjunction with a host computing device. The data storage device may include multiple memory devices. The multiple memory devices may be any type of memory device, as discussed in more detail below, including multiple flash memory devices. The host computing device may include one or more applications that send memory operation commands for execution by the multiple memory devices.

In one example implementation, the data storage device having the multiple flash memory devices may be used as a cache between the host computing device and another data storage device such as, for example a disc-based data storage device or other network-attached storage device. In this manner, data from the disc-based data storage device and/or the network-attached storage device also may be stored on the flash-based data storage device to enable faster read access to the data. In another example implementation, the data stored on the flash memory devices may be the result of a computation, where the formula is stored on the disc-based data storage device and/or the network-attached storage device.

Write memory operations commands may be used to write the data to the flash-based data storage device. A garbage collection process is used to free memory space on the flash-based data storage device so that data can be written to the flash memory devices. While the data stored in the data storage device being used as a cache may be considered expendable, since it is a copy of the data being stored on the disc-based data storage device or another storage device, it may be desirable to be able to designate the cache data as replicated data to indicate the data is a copy. Replicated data may be different from permanent data or data that is not a copy of data from another storage device. In this manner, the replicated data may remain on the flash memory devices and is still available to be read until the data is garbage collected, at which time the data is discarded (also referred to as erased or evacuated) from the flash memory devices and is no longer available to be read. That is, the replicated data is not copied to another location during garbage collection to reduce write amplification. However, the data remains available on the other data storage device and may be written again from the other storage device to the flash memory devices.

In one example implementation, the host computing device may use a write command that includes an indicator that indicates whether or not the data is replicated data, meaning data that is a copy of data stored in another storage device. During garbage collection, the replicated data may be identified as replicated data using the indicator and the replicated data may be not be copied and may be erased to free space on the memory devices for other data. Applications on the host computing device that use the data storage device as a cache may use the indicator as part of the write commands to mark data as replicated data. The data will remain available until the data storage device and/or the host device needs to garbage collect it, and at that time it will be deleted from the data storage device.

In one aspect, the data marked or indicated as replicated data may not be copied during garbage collection to reduce write amplification. Write amplification may occur because space on the memory devices needs to be reclaimed for later write commands and a block of data on a memory device may be partially still in use and partially no longer in use. In this situation, the data still in use is copied to another block to free up the space that's no longer in use. Data may be copied around multiple times in this way, which may increase the amount of time to process write commands, decrease throughput and increase the number of write-erase cycles a particular block undergoes. This may lead to the particular block going bad and not be available for use.

In one example implementation, a garbage collection engine, which may be implemented on the host device or the data storage device, may use a garbage collection policy (also referred to interchangeably as an heuristic or as a cost function) to determine which garbage collection units to copy during garbage collection. The garbage collection policy may be used to reduce write amplification such that replicated data is not copied during garbage collection. In one example implementation, the garbage collection policy may be based on the number of free pages of data (or pages with data that is no longer valid) and the number of replicated pages of data within each block. For instance, a cost function that is a linear combination of the number of free pages of data and the number of replicated pages within each block may be used to determine which block to garbage collect in order to minimize write amplification.

In one example implementation, the data storage device may track the data that has been marked as replicated data using a bitmap. For example, the data storage device and/or the host computing device may use one bitmap to track active pages of data in the data storage device and a second bitmap to track the pages of data that have been marked as replicated data. A garbage collection process would check both bitmaps to decide which pages of data to garbage collect in addition to using a garbage collection policy.

In one example implementation, a garbage collection control engine, the first bitmap and the second bitmap may be implemented on the host device. In other example implementations, the garbage collection control engine, the first bitmap and the second bitmap may be implemented in a memory controller on the data storage device.

Figure 1:
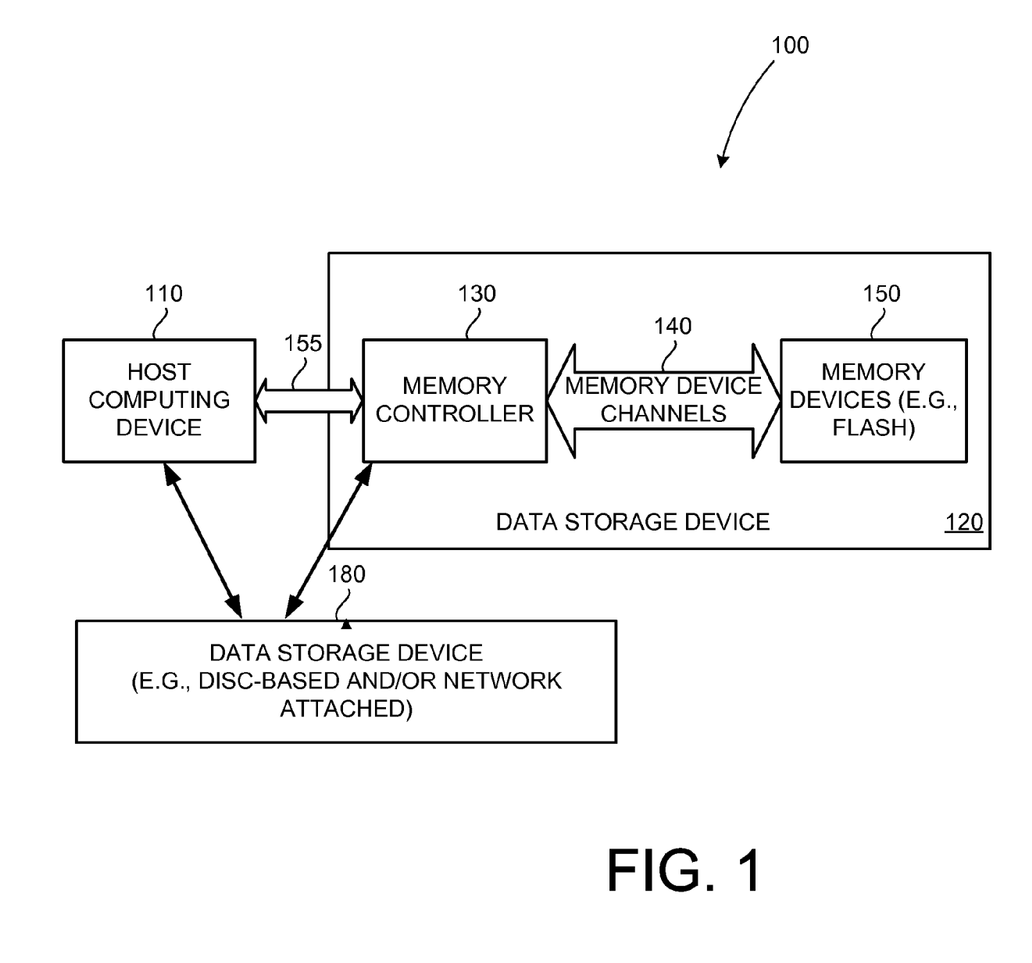
FIG. 1 is a block diagram illustrating a computing system in accordance with an example implementation.

FIG. 1 is a block diagram illustrating a computing system 100 in accordance with an example implementation. The computing system 100 includes a host computing device 110 and a data storage device 120. The host computing device 110 and the data storage device 120 may be implemented using the techniques described herein. The host 110, in this example may be an electronic device that is operably coupled with the data storage device 120, and may issue various types of commands and/or requests to the data storage device. The host 110 may take a number of forms. As some examples, the host 110 may be implemented as a personal computer, a laptop computer, a server, a tablet computer or a netbook computer. In other implementations, the host 110 may take other forms as well. The data storage device 120 also may take a number of forms. The data storage device 120 may be implemented as a number of appropriate devices that may work in conjunction with a host device (e.g., the host device 110) to store and/or retrieve electronic data. For instance, the data storage device may be a solid state drive (SSD) (e.g., a flash memory based SSD), a magnetic disk drive or an optical disk drive, as some examples.

As shown in FIG. 1, the data storage device 120 includes a memory controller 130, memory device channel interfaces 140 (also referred to as memory device channels) and memory devices 150. The memory devices 150 may be implemented using a number of different types of memory devices. For instance, the memory devices 150 may be implemented using flash memory devices (e.g., NAND flash memory devices), or other types of non-volatile memory devices. In certain implementations, volatile memory devices, such as random access memory devices, may be used. For purposes of this disclosure, the various implementations described herein will be principally discussed as being implemented using flash memory devices. It will be appreciated, however, that other approaches are possible and other types of memory devices may be used to implement the implementations described herein.

In the computing system 100, as well as in other implementations described herein, the memory controller 130 may obtain memory operation commands from the host computing device 110. When implementing the data storage device 120 using flash memory devices for the memory devices 150, the memory operation commands obtained by the memory controller 130 from the host computing device 110 may include flash memory read commands, flash memory write commands and flash memory erase commands, as well as other types of flash memory commands (e.g., move commands and/or copy commands). For purposes of this disclosure, the terms memory operation command, memory operation and memory command may be used interchangeably to describe machine-readable instructions (e.g., from a host computing device to a data storage device) to execute one or more data storage functions in a data storage device.

In the computing system 100, the memory devices 150 may include a plurality of memory devices, such as flash memory devices, that are organized into a plurality of memory channels. In such an approach, each of the memory channels may include one or more individual memory devices. Depending on the particular implementation, the individual memory devices of a given memory channel may be implemented in individual device packages, or alternatively, multiple memory devices of a given memory channel may be included in a single device package.

For instance, in an example implementation, the data storage device 120 may include multiple memory channels, where each memory channel includes multiple flash memory devices 150 that are implemented in multiple separate device packages (e.g., four flash memory devices per package). In such an approach, the memory controller 130 may communicate with the memory devices 150 of each memory channel using a separate memory device channel interface 140. Each memory device channel interface 140 may include a respective channel controller that is configured to facilitate communication between the memory devices 150 of the respective memory channel and the memory controller 130. For example, such channel controllers may be configured to manage a shared bus between the memory controller 130 and the memory devices 150 of a given memory channel, including communicating memory operation commands, chip select information, as well as managing communication of other data and control information between the memory controller 130 and the memory devices 150 over a corresponding memory device channel interface 140.

In one example implementation, the memory controller 130 and other components may be disposed on a printed circuit board and the memory devices 150 may be disposed on one or more other printed circuit boards. The printed circuit boards may be assembled together.

In one example implementation, a high speed link 155 may be used to connect the host computing device 110 and the data storage device 120. The link 155 may be a physical connector or it may be a logical connector. For instance, the link 155 may be a PCI-e link to connect and route signals between the host computing device 110 and the data storage device 120.

In one example implementation, the computing system 100 may include a second data storage device 180. The data storage device 180 may be operationally coupled to both the host computing device 110 and the data storage device 120 through the memory controller 130. The data storage device 180 may be a disc-based data storage device. The data storage device 180 also may include other types of data storage. A link similar to link 155 may operationally couple the data storage device 180 to the host computing device 110 and the data storage device 120.

In one implementation, the data storage device 120 may be used as a cache between the host computing device 110 and the data storage device 180. In this manner, data stored on the data storage device 120 using flash memory devices 150 may be accessed faster than the same data stored on the data storage device 180 using a disc to store the data, thus providing a faster response to read memory operation commands. In a similar manner, the data storage device 120 may be used to store computational results for formulas that are stored in the data storage device 180. The results may be accessed faster on the data storage device 120 than having to re-compute the result each time access to the result is desired.

Figure 2:
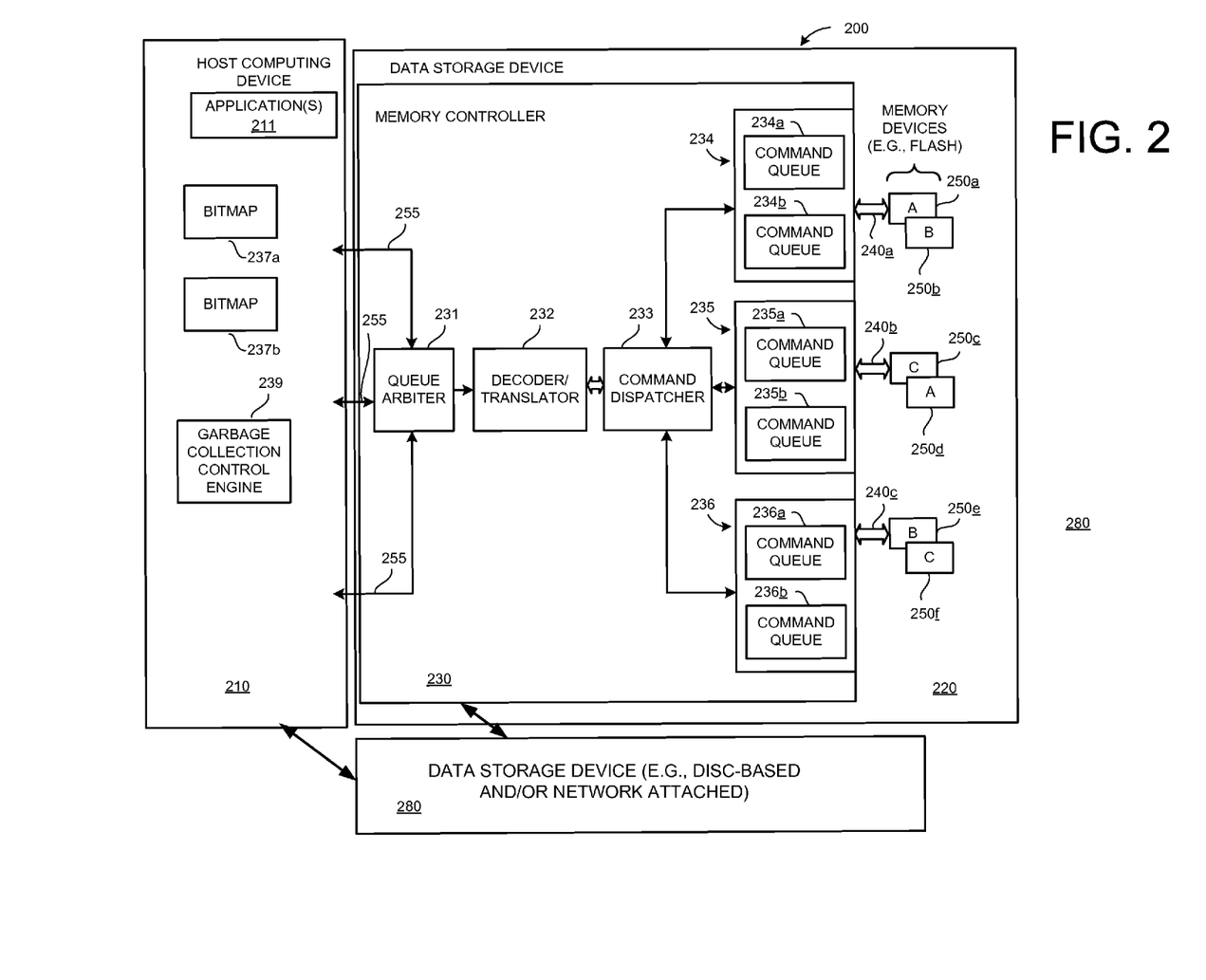
FIG. 2 is a block diagram illustrating another computing system in accordance with an example implementation.

FIG. 2 is a block diagram illustrating a computing system 200 in accordance with another example implementation. The computing system 200 shown in FIG. 2 includes similar elements to the computing system 100 shown in FIG. 1. Like elements of the computing system 200 to those of the computing system 100 are referenced with 200 series reference numerals that correspond with the 100 series reference numerals shown in FIG. 1. For instance, the computing system 200 includes a host computing device 210 and a data storage device 220. Optionally, the computing system 200 may include a second data storage device 280, which may be a disc-based and/or network attached data storage device.

The data storage device 220 includes a memory controller 230, memory device communication channels 240 (240*a*-240*c*), memory devices 250 (250*a*-250*f*). A link 255 connects and routes signals between the host computing device 210 and the data storage device 220. The link 255 may be a physical connector or a logical connector. A similar link may operationally couple the data storage device 280 to the host computing device 210 and the data storage device 220.

The various elements of the computing system 200 shown in FIG. 2 (as well as the other implementations described herein) are provided by way of illustration. The computing system 200 (and the other implementations described herein) may include other elements or aspects. For instance, the computing system 200, may include data path elements configured to communicate data between the host device 210 and the memory controller 230 and/or the memory devices 250*a*-250*f*. Such data path components may include, for example, one or more bus interfaces and/or a direct memory access (DMA) controller, as well as a number of other possible components. Further, the computing system 200 may also include additional control path elements other than those shown in FIG. 2. It will be appreciated that the particular components and/or aspects of the computing system 200, as well as the other implementations described herein, will depend, at least in part, on the particular implementation.

As shown in FIG. 2, the memory controller 230 of the computing system 200 includes a queue arbiter 231, a decoder/translator 232, a command dispatcher 233, command queue groups 234, 235 and 236, memory device channel interfaces 240*a*-240*c* and flash memory devices 250*a*-250*f*. The particular arrangement shown in FIG. 2 is given by way of example and other arrangements are possible. Of course, the computing system 200 may include additional or fewer memory devices and may also implement additional or fewer memory partitions.

As indicated above, in the computing system 200, the queue arbiter 231 of the memory controller 220 may be configured to obtain, from the host device 210, memory operation commands for execution by the memory devices in a number of fashions. For example, in one implementation, the queue arbiter 231 may be configured to obtain the memory operation commands from the host device in accordance with a partition work schedule for a plurality of memory partitions implemented in the data storage device. In one implementation, such a partition work schedule may be based on availability of allocated memory operation command slots for each respective memory partition.

In the computing system 200, the decoder/translator 232 may be configured to respectively determine which of the plurality of memory devices 250 corresponds with each of the memory operation commands. For instance, the decoder/translator 232 may be configured to perform logical to physical address translation on a respective memory address included in each of the memory operation commands that are obtained from the host computing device 210. Once the physical memory address is determined, the corresponding memory device 250 can be determined from the physical address.

In other implementations, address translation may be performed by the host device 210. In such an approach, the decoder/translator 232 could be eliminated, and the queue arbiter 231 may be directly coupled with the command dispatcher 233. In other implementations, the decoder/translator 232 may perform additional functions, such as decoding received memory commands into respective sub-commands.

The command dispatcher 233 of the computing system 200 may be operationally coupled with the queue arbiter 231 (e.g., via the decoder/translator 232 or directly), where the command dispatcher 233 is configured to receive the memory operation commands from the queue arbiter 231 (or sets of sub-commands for those memory operations commands) in a same order as obtained by the queue arbiter 231 from the host device 210.

In the computing system 200, the command dispatcher 233 may be further configured to dispatch the memory commands to their respective command queues 234-236, such as based on a physical memory address determined by the decoder/translator 232. In the computing system 200, the command dispatcher 233 may be configured to dispatch respective memory operations for a given memory device 250 based on availability of queue slots in a respective command queue of the command queues 234-236.

The memory controller 230 of the computing system 200 shown in FIG. 2 includes groups of command queues 234, 235 and 236 (or memory device command queues) that are operationally coupled with the command dispatcher 233. In the computing system 200, each command queue group 234, 235 and 236 corresponds with a respective memory channel, such as described herein. Further, each command queue group 234, 235 and 236 includes individual command queues that each respectively correspond with a memory device of their respective memory channel. As an example, the command queue group 234 (which includes a command queue 234a and a command queue 234b) is operationally coupled with the memory device channel interface 240a. The memory device channel interface 240a is, in turn, operationally coupled with the memory devices 250a and 250b. The command queues 234a and 234b are associated, respectively, with the memory devices 250a and 250b. In such an arrangement, the memory device 250a would receive memory operation commands from the command queue 234a, while the memory device 250b would receive memory operation commands from the command queue 234b. The command queue groups 235 and 236 (and their command queues 235a, 235b, 236a and 236b) correspond with memory device channel interfaces 240b and 240c, and memory devices 250c, 250d, 250e and 250f in similar fashion as discussed above for the command queue group 234, the memory device channel interface 240a, and the memory devices 250a and 250b.

In the computing system 200, each of the command queues 234a-236b may be configured to receive the dispatched memory operation commands corresponding with its respective memory device 250a-250f from the command dispatcher 233 in a same order as received by the command dispatcher 233 from the queue arbiter. The commands queues 234a-236b may each be further configured to provide the received memory operation commands to their respective memory devices 250a-250f in a first-in-first-out order. Also, in the computing system 200, in implementations where each of the memory devices 250a-250f is associated with a respective memory partition, the command queues 234a-236b would likewise be associated with the same memory partition as their corresponding memory device.

The host device 210 may include a garbage collection control engine 239. While illustrated and described as being implemented on the host device 210, in other example implementations, the garbage collection control engine 239 may be implemented as part of the memory controller 230.

The garbage collection control engine 239 can be used to coordinate and control garbage collection operations on the data storage device 220. Cells of memory devices 250 are organized in block units and each block includes a plurality of pages. Data can be written to and read from a memory device 250 in page-sized units, but when data is erased from a memory device 250, it is to be erased in block-sized units. In addition, memory devices 250 cannot be updated in-place, that is, data written to a page of a chip cannot be overwritten by new data. Instead, the new data must be written to a different location, and the old data must be declared invalid. Because of these constraints, when updating of data on the data storage device an out-of-place updating scheme must be used in which the new data are written to a different physical location than the old data, and then the old data are declared invalid.

Figure 3:
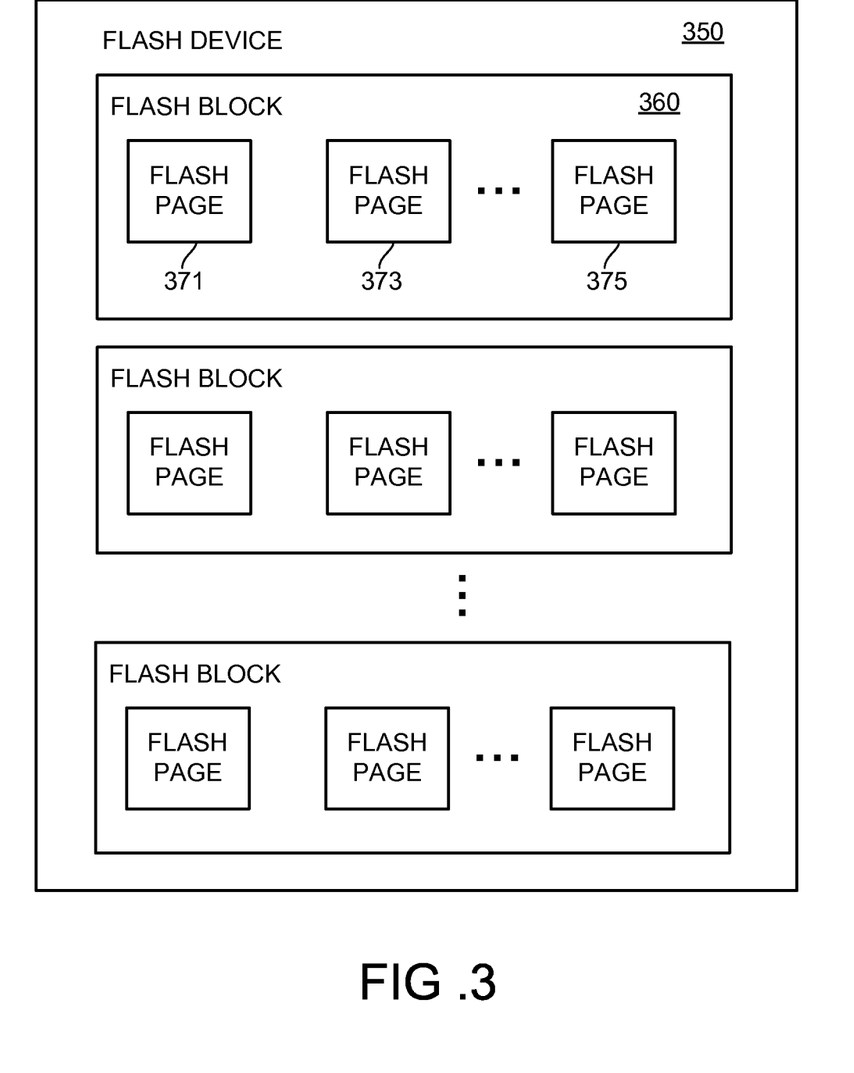
FIG. 3 is a block diagram illustrating a flash memory device that may be used in the computing systems of FIGS. 1 and 2 in accordance with example implementations.

Referring also to FIG. 3, a block diagram illustrates a flash memory device 350 that may be used in the computing systems of FIGS. 1 and 2 in accordance with example implementations. For instance, the flash memory device 350 may be used to implement the memory devices 150 of the computing system 100 shown in FIG. 1 and/or the flash memory devices 250 of the computing system 200 shown in FIG. 2. As illustrated in FIG. 3, the flash memory device 350 includes a plurality of flash memory blocks, such as the flash memory block 360. While only three flash memory blocks are shown in the flash memory device 350, as is indicated in FIG. 3, the flash memory device 350 may include additional flash memory blocks. As is also shown in FIG. 3, each flash memory block of the flash memory device 350 may include a plurality of flash memory pages, such as the flash memory pages 371, 373 and 375. As with the flash memory blocks of the flash memory device 350, while only three flash memory pages are shown for each flash memory block of the flash memory device 350, as indicated in FIG. 3, each flash memory block may include additional flash memory pages.

Referring back to FIG. 2, thus, pages of memory devices 250 can have one of multiple states including: (1) free (wherein the page contains no data and is available to store new or updated data); (2) valid (wherein the page contains new or recently updated data that is available to be read); (3) invalid (wherein the page contains obsolete data or data marked for deletion); or (4) replicated (wherein the page contains data that is a copy of data stored in another storage device or contains data, which is the result of a computation for a formula stored in another storage device). As one can imagine, after some cycles of updating data on a memory device 250 using the out-of-place updating procedure, many blocks will have both valid and invalid pages, which reduces the number of free pages available to receive new or updated data.

Therefore, a garbage collection process is used to reclaim free pages on a memory device. In a garbage collection process, a block is targeted for having all of its data erased, so that the pages of the block can be reclaimed as free pages. Before erasing the pages of the block, the valid pages of the block are copied to a new location into free pages of one or more different blocks or one or more different memory devices 250. After all the valid pages of the targeted block are successfully copied to the new locations, the pages of the targeted block are erased, so that they are free to have data written to them.

Garbage collection is important for using a flash memory device, but garbage collection is also time-consuming. This is because in a flash memory storage device, write operations to a flash memory chip take much longer (e.g., approximately 10 times longer) than read operations from a flash memory chip, and because erase operations take much longer (e.g., approximately 10 times longer) than write operations. Thus, the interleaving garbage collection operations with the read operations associated with reading a file from the data storage device 220 to the host computing device 210 can significantly delay the reading of the data file from the data storage device to the host computing device.

Garbage collection can be performed when it is necessary to reclaim free space on a memory chip in order to write new or updated data to the chip. For example, if the chip contains fewer free pages than are necessary to receive the data that is intended to be written to the chip, then garbage collection must be performed to erase enough blocks to reclaim a sufficient number of pages to receive the data to be written to the chip.

As discussed above, in one example implementation, the data storage device 220 may be used as a cache for data between the host computing device 210 and the data storage device 280. During garbage collection, pages marked as replicated may not be copied, even if the replicated data is valid, and may be erased and reclaimed as free pages. In this manner, pages marked as replicated will not be copied during garbage collection and will reduce write amplification.

When an application 211 on the host device 210 writes data to the data storage device 220, the application 211 through the host device 210 may use an indicator to indicate that the data is replicated data. In one example implementation, the indicator may be a bit in the write command that is set to indicate that the data is replicated data. If the bit is not set, then the data is not replicated data, but is instead permanent data that should be copied to a new location and only be erased during garbage collection if the data is no longer valid. Data that is marked as replicated data may be made available for erasure during garbage collection without first copying, as may be determined by the host device 210 and/or the memory controller 230.

In one implementation, the host device 210 may control garbage collection through the garbage collection engine 239 and determine which blocks of data to copy and to erase during garbage collection. In other implementations, the garbage collection engine 239 may be located and implemented on the memory controller 230. A garbage collection policy or cost function may be used to determine which blocks of data to copy and to erase. The cost function may be based on a number of free pages and a number of replicated pages in each of the blocks. For instance, the blocks with the highest scores may be erased and reclaimed as free pages.

In one implementation, the cost function may be a linear combination of the number of free pages plus the number of replicated pages within each block. The cost function also may include one or more constants that are used to weight the number of free pages and the number of replicated pages. For example, a first constant may be multiplied by the number of free pages and a second constant may be multiplied by the number of replicated pages within each block. The first constant may be greater than the second constant. In one example, the first constant may be 1 and the second constant may be 0.5. The applications 211 on the host device 210 may determine the values of the constants, as may be appropriate for particular applications.

The garbage collection engine 239 may erase the blocks of data during garbage collection using the cost function with the blocks having the highest cost function being erased. The blocks with the highest cost function include the fewest blocks that need to be copied before the block is erased. As discussed above, the garbage collection policy that takes into account replicated blocks that don't need to be copied may reduce write amplification and reduce the wear on the blocks. A notification may be provided to the application 211 that the replicated data was not copied and was erased. In this manner, the application 211 is aware that the replicated data is no longer available on the data storage device 220 and that the data should be read from the data storage device 280 and/or rewritten from the data storage device 280 to the data storage device 220. The data storage device 220 may use an interrupt to notify the host device 210.

The garbage collection engine 239 may first copy blocks of data that are valid and not replicated data (i.e., the data is not a copy of data from another storage device) before the block is erased. In this manner, the indicator that was used to mark the data when the data was written to the data storage device 220 may be used to determine which data is replicated data and which data is not replicated data.

In one implementation, the host device 210 may send a message to the data storage device 220 indicating that the data at a particular address is a replicated address. For example, the host device 210 may send a message to the memory controller 230 with the logical address indicating that the address is now replicated. Additionally, the host device 210 may send a message to mark the data at a particular address as no longer replicated. In this manner, the data may be marked as replicated and unmarked as replicated in a manner other than an indicator in a write command. The messages sent by the host device 210 may be done in conjunction with a separate write command.

The memory controller 230, in conjunction with or at the direction of the garbage collection control engine 239, may determine when to perform garbage collection. In this manner, the management of the data storage device 220 and the performance and efficiency of the data storage device 220 may be divided between host computing device 210, which determines the pages to erase using the cost function, and the data storage device 220, which performs the garbage collection.

In one example implementation, the data storage device may track the data that has been marked as replicated using one or more bitmaps 237a and 237b. For example, the data storage device 220 may use one bitmap 237a to track active pages of data in the data storage device 220 and a second bitmap 237b to track the pages of data that have been marked as replicated. The bitmaps 237a and 237b may be implemented on the host device 210. In other example implementations, the bitmaps 237a and 237b may be implemented as part of the memory controller 230 on the data storage device 220.

Figure 4:
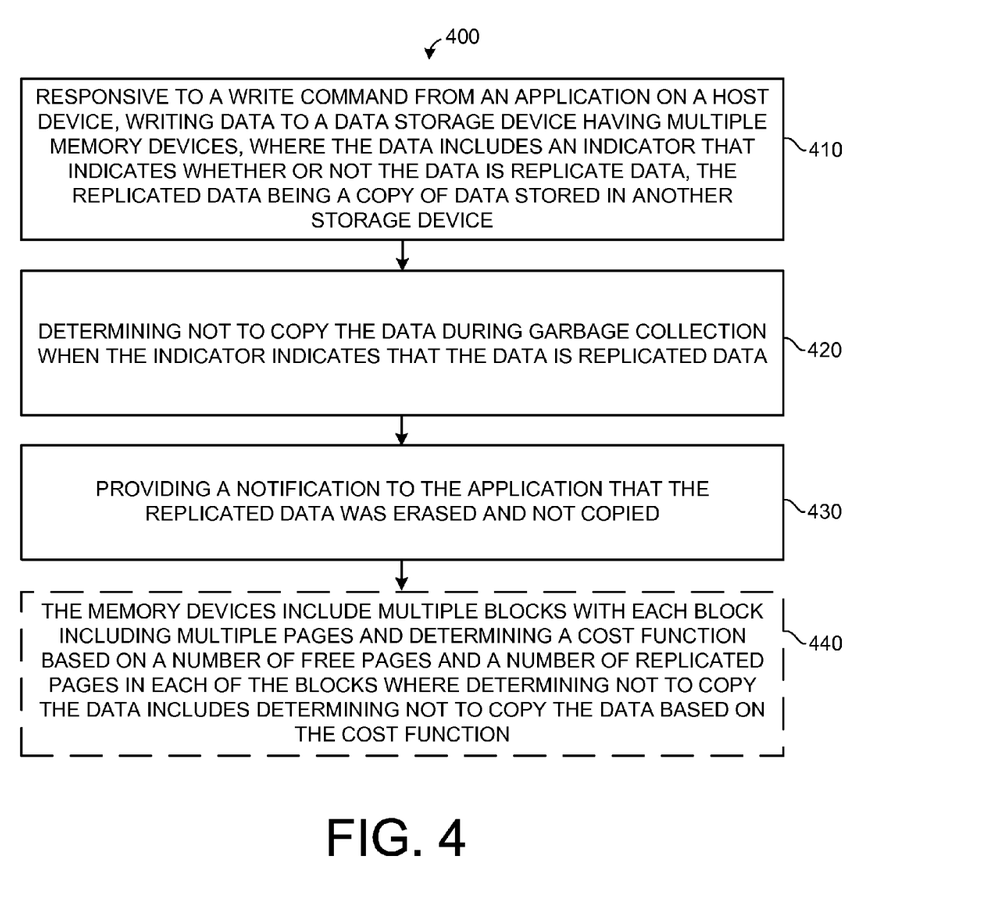
FIG. 4 is an example flow diagram illustrating an example process for managing data on a data storage device.

Referring to FIG. 4, an example flowchart illustrates and example process 400 using the systems and components described above with respect to FIGS. 1-3. Process 400 includes responsive to a write command from an application on a host device, writing data to a data storage device having multiple memory devices, where the data includes an indicator that indicates whether or not the data is replicated data, the replicated data being a copy of data stored in another storage device (410). For example, as discussed above, the application 211 on the host device 210 may issue a write command to the data storage device 230. The write command may include the indicator that marks the data either as replicated data or not replicated data. For instance, replicated data may be data that is a copy of data stored in another storage device such as data storage device 280. In one implementation, the indicator may be a bit that is either set to indicate replicated data or not set to indicate permanent or non-replicated data. It would be understood that the bit setting could be reversed.

Process 400 includes determining not to copy the data during garbage collection when the indicator indicates that the data is replicated data (420). For example, as discussed above, the garbage collection engine 239, which may be implemented on the host device 210 or the data storage device 220, may determine not to copy the data when the indicator indicates that the data is replicated data during garbage collection. By not copying replicated data during garbage collection, write amplification may be reduced. Then, the replicated data may be erased. The garbage collection engine 239 may direct or cause the memory controller 230 to perform the actual erase function, but the garbage collection engine 239 may first determine which data is to be copied or not copied during the garbage collection.

Process 400 includes providing a notification to the application that the replicated data was erased and not copied (430). For example, the memory controller 230 may provide a notification to the application 211 that the replicated data was erased and was not copied. In one implementation, the memory controller 230 may use an interrupt to notify the host device 210, which in turn notifies the application 211.

Process 400 optionally may include determining a cost function based on number of free pages and a number of replicated pages in each of the blocks and determining not to copy the data based on the cost function (440). For example, as discussed above, the garbage collection control engine 239 may determine a cost function based on a number of free pages and a number of replicated pages in each of the blocks on the memory devices 250a-250f and determine which of the blocks to copy before erasure or evacuation of the blocks based on the cost function. The cost function may be a linear combination of the number of free pages and the number of replicated pages in each of the blocks. The blocks with the highest cost function may be ones that require the least amount of copying before being erased during garbage collection. Constants may be used to weight the number of free pages and the number of replicated pages.

Figure 5:
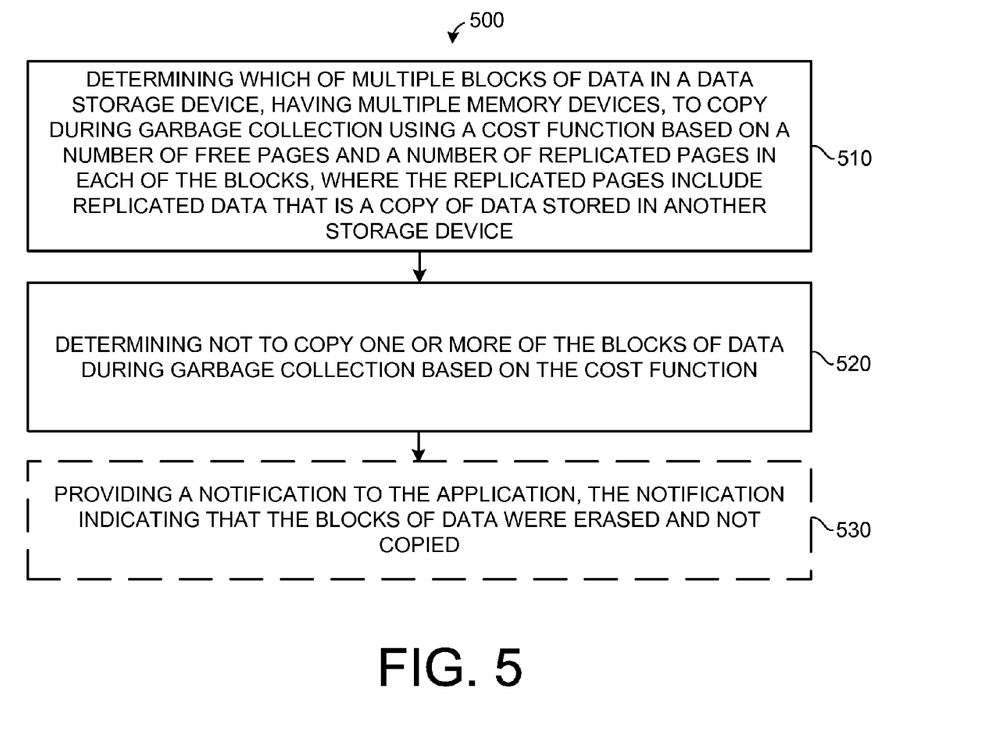
FIG. 5 is an example flow diagram illustrating an example process for managing data on a data storage device.

Referring to FIG. 5, an example flowchart illustrates and example process 500 using the systems and components described above with respect to FIGS. 1-3. Process 500 may include determining which of multiple blocks of data in a data storage device having multiple memory devices to copy during garbage collection using a cost function based on a number of free pages and a number of replicated pages in each of the blocks, where replicated pages include replicated data that is a copy of data stored in another storage device (510). Process 500 also includes determining not to copy one or more of the blocks of data during garbage collection based on the cost function (520). In this manner, blocks with the largest number of free pages and replicated pages may be garbage collected first because those blocks do not need to be copied before being erased. This may help reduce write amplification. Process 500 may optionally include providing a notification to the application, where the notification indicates that the blocks of data were erased and not copied (530).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations.

What is claimed is:

1. A method, comprising:
responsive to a write command from an application on a host device, writing data to a data storage device having a plurality of memory devices, wherein the data includes an indicator that indicates whether or not the data is replicated data, the replicated data being a copy of data stored in another storage device;
determining not to copy the data during garbage collection when the indicator indicates that the data is replicated data; and
providing a notification to the application that the replicated data was erased and not copied.

2. The method of claim 1 wherein the plurality of memory devices includes a plurality of blocks with each block including a plurality of pages and further comprising determining a cost function based on a number of free pages and a number of replicated pages in each of the blocks and wherein determining not to copy the data comprises determining not to copy the data based on the cost function.

3. The method of claim 2 wherein the cost function is a linear combination of a first constant multiplied by the number of free pages plus a second constant multiplied by the number of replicated pages in each of the blocks.

4. The method of claim 3 wherein the first constant is greater than the second constant.

5. The method of claim 1 further comprising copying the data when the indicator indicates that the data is not replicated data.

6. The method of claim 1 wherein the data is a result of a computation of a formula wherein the formula is stored in another storage device.

7. A method, comprising:
determining which of a plurality of blocks of data in a data storage device having a plurality of memory devices to copy during garbage collection using a cost function based on a number of free pages and a number of replicated pages in each of the blocks, wherein the replicated pages include replicated data that is a copy of data stored in another storage device; and
determining not to copy one or more of the blocks of data during garbage collection based on the cost function.

8. The method of claim 7 wherein the cost function is a linear combination of a first constant multiplied by the number of free pages plus a second constant multiplied by the number of replicated pages in each of the blocks.

9. The method of claim 8 wherein the first constant is greater than the second constant.

10. The method of claim 7 further comprising receiving a write command from an application on a host device to write data on one of the memory devices, wherein the write command includes an indicator that indicates whether or not the data is replicated data.

11. The method of claim 10 further comprising providing a notification to the application, the notification indicating that the blocks of data were erased and not copied.

12. The method of claim 7 wherein the data is a result of a computation of a formula wherein the formula is stored in another storage device.

13. A data storage device, comprising:
a plurality of memory devices, each of the memory devices being arranged into a plurality of blocks having a plurality of pages for storing data; and
a memory controller operationally coupled with the flash memory devices, the memory controller being configured to:
write data to one of the memory devices responsive to a write command from an application on a host device, wherein the data includes an indicator that indicates whether or not the data is replicated data, the replicated data being a copy of data stored in another storage device,
determine not to copy the data during garbage collection when the indicator indicates that the data is replicated data, and
provide a notification to the application that the replicated data was erased and not copied.

14. The data storage device of claim 13 wherein the memory controller is configured to determine a cost function based on a number of free pages and a number of replicated pages in each of the blocks and is configured to determine not to copy the data based on the cost function.

15. The data storage device of claim 14 wherein the cost function is a linear combination of a first constant multiplied by the number of free pages plus a second constant multiplied by the number of replicated pages in each of the blocks.

16. The data storage device of claim 13 wherein the data is a result of a computation of a formula wherein the formula is stored in another storage device.

17. A system comprising:
a host device comprising one or more applications; and
a data storage device operationally coupled with the host device, the data storage device comprising:
a plurality of memory devices, each of the memory devices being arranged into a plurality of blocks having a plurality of pages for storing data; and
a memory controller operationally coupled with the flash memory devices, the memory controller being configured to:
write data to one of the memory devices responsive to a write command from one of the applications on the host device, wherein the data includes an indicator that indicates whether or not the data is replicated data, the replicated data being a copy of data stored in another storage device,
determine not to copy the data during garbage collection when the indicator indicates that the data is replicated data, and
provide a notification to the application that the replicated data was erased and not copied.

18. The system of claim 17 the host device is capable of determining a cost function based on a number of free pages and a number of replicated pages in each of the blocks and sending a command to the memory controller to not copy the data based on the cost function.

19. The system of claim 18 wherein the cost function is a linear combination of a first constant multiplied by the number of free pages plus a second constant multiplied by the number of replicated pages in each of the blocks.

20. The system of claim 17 wherein the data is a result of a computation of a formula wherein the formula is stored in another storage device.

* * * * *